3,301,771
METHOD FOR PURIFYING AQUEOUS SOLUTIONS OF METHYLBUTINOL THROUGH REMOVAL OF ITS ACETONE CONTENTS
Vittorio Cariati, Marcello Massi Mauri, and Alessandro Di Ciò, San Donato Milan, Italy, assignors to Snam S.p.A., Milan, Italy, a company of Italy
Filed Aug. 29, 1963, Ser. No. 305,518
Claims priority, application Italy, Sept. 4, 1962, 26,871, Patent 692,788
1 Claim. (Cl. 203—69)

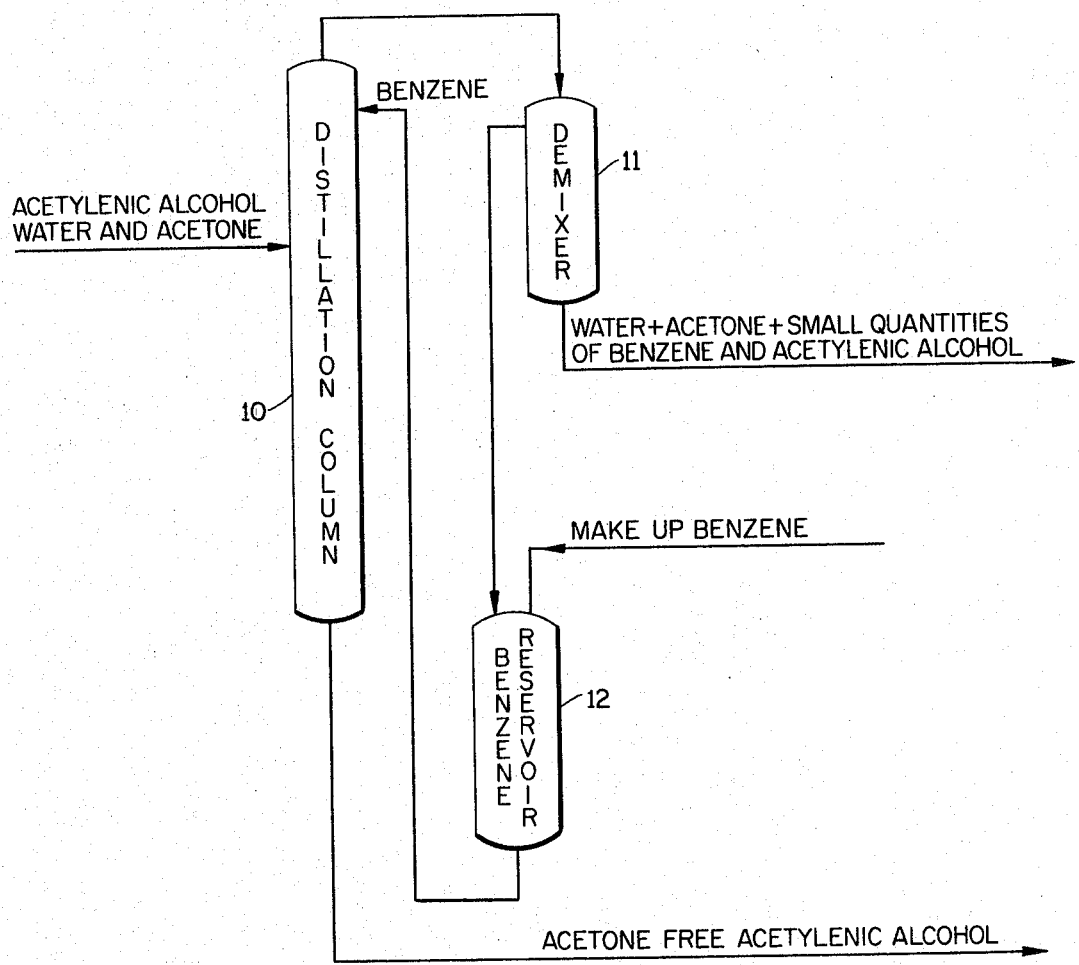

It is a known fact that even minute traces of acetone prevent the stereospecific polymerization of isoprene in the presence of catalysts of the Ziegler type so that it is essential to cut down the contents of acetone down to a few parts for one million parts of isoprene.

The first intermediate stage in the production of isoprene according to the method starting from acetone and acetylene is the 2-methyl-3-butin-2-ol in an aqueous solution.

Since the conversion of acetone into methylbutinol is never complete, said intermediate stage always contains more or less substantial amounts of acetone which cannot be removed through a mere rectifying treatment. The acetone carried along up to the end of the procedure, soils the isoprene produced which has to be subjected to a thorough final purification.

Now we have found that it is possible to separate simply and economically the acetone out of aqueous solutions of methylbutinol through distillation with benzene and this is possible even when feeding a product containing comparatively large amounts of acetone.

The methylbutinol obtained is completely devoid of acetone in all cases.

In fact, the acetone collects at the head of the column with the water, the benzene and a small amount of methylbutinol. Said mixture separates into two phases, of which the water-containing phase which is not recycled into the column, carries along with it the totality of the acetone contained in the batch fed into reaction.

The single attached drawing is a diagrammatic illustration of one method of operating according to the teachings of the present invention.

The mixture of acetylenic alcohol (methyl butinol), water and acetone is introduced into the distillation column 10 at a point midway the height of the column; and benzene is introduced into the column above the mixture.

The distillate is delivered to the demixer 11, while acetone-free acetylenic alcohol (methyl butinol) is drawn off from the bottom of the distillation column. In the demixer 11 some of the benzene is separated, and is returned to the benzene reservoir 12, into which make-up benzene is also delivered. Water, acetone and small quantities of benzene and acetylenic alcohol are drawn off from the bottom of the demixer.

In order to better illustrate the invention, we will now disclose a number of embodiments thereof.

*Example 1*

Making use of a continuously operating column 10 of a height of 6 mm. and of a diameter of 150 mm. filled with porcelain Raschig rings measuring 8 x 8 mm. there are fed into said column 5 kilogrammes per hour of a mixture the composition of which is at follows:

Methylbutinol, percent by weight _____ 60
Water, percent _____ 34
Acetone, percent _____ 6

At the beginning of the operation, 4 kg. of benzene are incorporated, which during the rectifying treatment collect at the head of the column under conditions of equilibrium and are recycled as a reflux.

From the head of the column, is taped off an aqueous phase the composition of which is as follows:

Water, percent by weight _____ 81.7
Acetone, percent _____ 14.3
Methylbutinol, percent _____ 4
Benzene _____ traces The methylbutinol carried off in the tailings is completely devoid of acetone and contains only traces of benzene and water.

*Example 2*

Resorting to the same column as in the case of Example 1, there are fed into it 8 kilogrammes per hour of a mixture the composition of which is as follows:

Percent
Methylbutinol _____ 68.3
Water _____ 29.5
Acetone _____ 2

By operating as in the case of Example 1, there are obtained in the tailings 5.4 kilogrammes per hour of pure methylbutinol while the mixture tapped off as a head product has the following composition:

Water, percent by weight _____ 90.4
Acetone, percent _____ 6.1
Methylbutinol, percent _____ 3.5
Benzene _____ traces

We claim:
A method for the recovery of methyl butinol from an aqueous solution of methyl butinol containing acetone, consisting in the steps of distilling said solution in the presence of benzene, recovering overhead a distillate product, separating said distillate product into an aqueous phase containing the acetone and a benzene phase, recycling the said benzene phase to the distillation step, and recovering as bottoms pure methyl butinol.

References Cited by the Examiner
UNITED STATES PATENTS 2,826,614  3/1958  Whitfield _____ 260—638
2,988,573  6/1961  Siebentritt et al. _____ 203—69
3,082,260  3/1963  Tedeschi et al. _____ 260—638

NORMAN YUDKOFF, *Primary Examiner.*
WILBUR L. BASCOMB, Jr., *Examiner.*